UNITED STATES PATENT OFFICE.

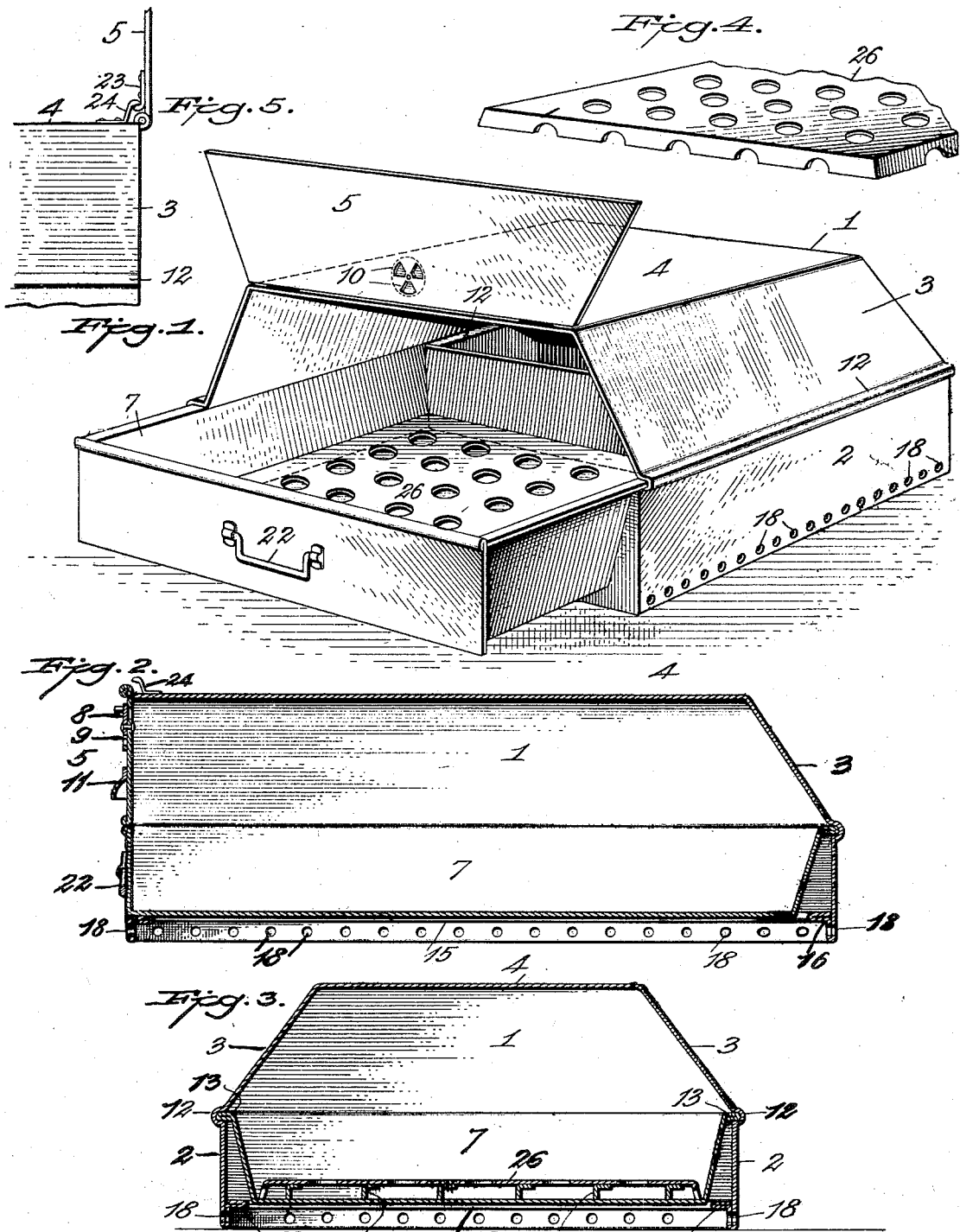

HENRY A. SPRINGER, OF DENVER, COLORADO.

ROASTING AND BAKING PAN.

985,712.

Specification of Letters Patent. Patented Feb. 28, 1911.

Application filed December 3, 1909. Serial No. 531,241.

*To all whom it may concern:*

Be it known that I, HENRY A. SPRINGER, a citizen of the United States of America, residing in the city and county of Denver and State of Colorado, have invented a new and useful Roasting and Baking Pan, of which the following is a specification.

My invention relates to an improved roasting, steaming and baking pan, and the objects of my invention are: First—To provide a utensil of this character comprising a casing open at one end, a pan slidably mounted in said casing, and a hinged door for covering the open end of the casing above the pan, whereby the contents of the pan may be inspected without withdrawing the pan. Second—To provide a heat regulating and an even heat distributing roasting, steaming and baking pan. Third—To provide a roasting, steaming and baking pan provided with a heat retaining and circulating casing and a food holding draw form of a pan that is removably inclosed by said casing. I attain these objects by the mechanism illustrated in the accompanying drawings, in which, Figure 1 is a perspective view of the improved cooking utensil showing the pan partly withdrawn from the casing and the door raised to give access to the casing. Fig. 2 is a vertical, longitudinal, sectional view through the utensil, the removable tray being omitted. Fig. 3 is a transverse, sectional view thereof. Fig. 4 is a fragmental, perspective view of the removable tray; and Fig. 5 is a fragmental view, illustrating the catch for holding the cover in a raised position.

Similar letters of reference refer to similar parts throughout the several views.

Referring to the drawings, the numeral 1 designates the food-holding pan inclosing casing portion of my roasting, steaming and baking pan. This casing portion 1 comprises a rectangular shaped casing, which is made of sheet iron or other suitable metal or material, and is made of a length and width and height to form a roasting pan suitable for general household roasting, steaming and baking purposes.

The base portion of the casing is provided with substantially straight vertical sides 2, which extend upward from its bottom portion for a portion of the height of the pan, from which point the sides and the rear end portion 3 preferably slope inwardly and upwardly to a sufficient height to form a food-holding pan inclosure of the desired capacity. The sides then blend into a flat top portion 4. The opposite or front end is preferably formed straight or at right angles to the bottom of the casing. A lid 5 is hinged to the top end of the front end portion, and this lid is arranged to only close the inclined side top portion of the casing and its lower edge is arranged to bear against the top edge and outer or front end portion of a food-holding pan 7, which is slidably mounted in the casing, as will be presently described.

The lid is provided with a damper 8, which may be of any suitable form but which preferably consists of a pivotally moving disk that is provided with air entrance apertures 9, which are fitted over similar air entrance apertures 10 arranged in a circle at a short distance apart through the lid of the casing. The lower edge of the lid is also provided with a handle 11. This casing is provided on its inside surface with slideways 12 which may be formed on it in any suitable manner but which I preferably place on the opposite sides of the inside of the casing at the junction of the vertical with the inwardly sloping sides and which preferably consist of outwardly curved head portions, each of which on its respective side forms a semi-circular groove along the inside of each side of the whole length of the casing. These grooves 12 form slideways for the top side edges 13 of the food holding pan 7, which are extended beyond the side of the pan far enough to form guideways that are adapted to extend into and fit slidably into the grooves' slideways. The guideways 13 may also be of any suitable form or shape that will fit slidably within the slideways of the casing.

The bottom of the casing is provided with an open space 15, that is of about the size of the food holding pan, which leaves a rim edge portion 16 around the bottom of the casing. This rim portion is preferably reinforced or stiffened by folding the metal upon itself or by the addition of additional strips of metal to the edge of the casing, or by any other suitable means. The side and end edges of the casing, close to its bottom edges are provided with a row of small air inlet apertures 18, which permit the hot air of an oven to enter the bottom of the casing and circulate around the food holding pan and throughout the interior of the casing, as will be explained more fully hereinafter.

The rear end and also the sides of this pan 7 are preferably sloped inwardly from the top edges of the pan to its bottom portion, in order to allow the hot air of an oven as it circulates upward through the air apertures and also through the open space in the bottom of the casing to flow directly against the inclined side surface of the pan. This pan 7, comprises a rectangular shaped pan of a length that will slide into the casing against its rear end and be flush with its front end so that the lid will swing down against the upper end edge of the pan and at the same time fit closely against the side edges of the front end of the casing.

The front end portion of the pan 7 is, however, preferably made straight or at substantially right angles to the bottom of the casing, and it is provided with a handle 22, by which it may be pushed into or withdrawn from the casing.

The lid is provided close to its hinge with a spring 23, which is arranged to engage a spring clip 24 that is secured to the top portion of the casing in a position to be engaged by the spring 23 of the lid in such a manner as to lock the lid in an opened position.

The pan 7 is provided with an integral bottom portion, which is exposed to the direct flow of heat from the bottom of an oven in which the pan is placed through to the open space in the bottom of the casing, but when cooking some articles of food it is desired to raise the article slightly above the bottom of the pan 7 and a removable, perforated bottom plate 26 is provided. This perforated plate is flat and smooth on its upper food resting surface, but is preferably provided with stiffening ribs on its under side surface, which permits it to rest on the bottom of the pan 7, but holds its food resting surface a short distance above and out of contact with the bottom of the pan 7. This plate 26 may be made of any suitable metal or material, and it is fitted loose enough within the pan to be easily and quickly lifted out of it.

My invention provides a practical roasting, steaming and baking pan that confines and distributes the heat evenly over the surface of the articles of food being cooked therein, and permits of a regulated degree of heat being used.

Having described my invention, what I claim as new and desire to secure by Letters Patent is:

In a cooking utensil as specified, a casing open at its bottom and front end, the sides of which are bent to form oppositely arranged slideways; a pan having flanges on its sides adapted to rest in said slideways, the front end of said pan acting to close the lower half of the opening in the front end of the casing, and a hinged door on the casing which is adapted to close the upper half of the said opening.

In testimony whereof I affix my signature in presence of two witnesses.

HENRY A. SPRINGER.

Witnesses:
G. SARGENT ELLIOTT,
ADELLA M. FOWLE.